United States Patent
Cohn et al.

(10) Patent No.: US 11,546,049 B1
(45) Date of Patent: Jan. 3, 2023

(54) SYSTEM TO MANAGE SATELLITE COMMUNICATIONS

(71) Applicant: AMAZON TECHNOLOGIES, INC., Seattle, WA (US)

(72) Inventors: Daniel T. Cohn, Bainbridge Island, WA (US); Andrew B. Dickinson, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 183 days.

(21) Appl. No.: 16/934,577

(22) Filed: Jul. 21, 2020

(51) Int. Cl.
*H04B 7/185* (2006.01)
*H04W 4/00* (2018.01)

(52) U.S. Cl.
CPC ..... *H04B 7/18513* (2013.01); *H04B 7/18519* (2013.01)

(58) Field of Classification Search
CPC ............ H04B 7/18513; H04B 7/18541; H04B 7/18521; H04B 7/18519; H04B 7/18584; H04B 7/1851; H04B 7/195; H04L 69/22; H04L 47/323; H04L 61/2007; H04L 67/12; H04L 69/16; H04L 45/04; G06F 16/951; G06F 17/30864; H04W 84/06; H04W 36/0005; H04W 36/0088; H04W 4/70
USPC .......................................................... 370/316
See application file for complete search history.

(56) References Cited

U.S. PATENT DOCUMENTS

| | | | |
|---|---|---|---|
| 9,681,337 B2* | 6/2017 | Davis | H04W 36/0005 |
| 10,177,837 B2* | 1/2019 | Ravishankar | H04B 7/18513 |
| 10,506,483 B1* | 12/2019 | Williamson | H04B 7/18584 |
| 2008/0212517 A1* | 9/2008 | Thesling | H04L 5/023 370/316 |
| 2013/0282897 A1* | 10/2013 | Siegel | H04L 45/02 709/224 |
| 2016/0094467 A1* | 3/2016 | Hong | H04L 47/2441 370/235 |
| 2017/0337511 A1* | 11/2017 | Shroff | H04W 4/029 |
| 2018/0220196 A1* | 8/2018 | Slater | H04N 21/2401 |
| 2020/0120625 A1* | 4/2020 | Park | H04W 4/40 |
| 2020/0128114 A1* | 4/2020 | Kloberdans | H04L 47/323 |

* cited by examiner

*Primary Examiner* — Edan Orgad
*Assistant Examiner* — Vanneilian Lalchinthang
(74) *Attorney, Agent, or Firm* — Lindauer Law, PLLC

(57) ABSTRACT

Satellites provide communication between devices such as user terminals (UTs) and ground stations that are in turn connected to points-of-presence (PoP) that connect to other networks, such as the Internet. Many factors affect latency for data passing between the PoP and the UT. The PoP accepts downstream data addressed to the UT and determines a target delivery window (TDW) indicating a window of time within which the downstream data is expected to be delivered. Communication resources are allocated to the downstream data based on the TDW. At subsequent points, such as at the ground station, the TDW is assessed to determine whether to continue sending the downstream data or to use a different communication resource. For example, a first ground station will forward the downstream data to a second ground station if the uplink will not be able to deliver the downstream data before expiration of the TDW.

20 Claims, 6 Drawing Sheets

500

| TARGET DELIVERY WINDOW DATA 168 ||
|---|---|
| PARAMETER 502 | VALUE 504 |
| START | 2200 |
| ESTIMATED GS DELIVERY | 2205 |
| ESTIMATED SAT DELIVERY | 1109 |
| END | 2215 |
| DURATION | 15 |
| ... | ... |

| COMMUNICATION RESOURCE DATA 170 ||
|---|---|
| PARAMETER 502 | VALUE 504 |
| GROUND STATION ID. | CEDAR74 |
| TARGETED TIMESLOT | 15011 |
| SATELLITE ID | 3941 |
| G.S. UPLINK MODEM | 4 |
| UPLINK TIMESLOT START | 2201 |
| UPLINK TIMESLOT END | 2220 |
| SAT DOWNLINK MODEM | 293 |
| DOWNLINK TIMESLOT START | 2205 |
| DOWNLINK TIMESLOT END | 2215 |
| SUBBEAM ID | 7 |
| ... | ... |

UPLINK RESOURCE 442: G.S. Uplink Modem, Uplink Timeslot Start, Uplink Timeslot End DOWNLINK RESOURCE 444: Sat Downlink Modem, Downlink Timeslot Start, Downlink Timeslot End, Subbeam ID

FIG. 5

SYSTEM TO MANAGE SATELLITE COMMUNICATIONS

BACKGROUND

Communications involving satellites servicing many user terminals introduce significant latencies due to propagation delay, traffic congestion, and other factors. This results in a complex environment in which providing an assured quality of service (QoS) for delivery of data using traditional techniques is not possible.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 5 illustrates data associated with operation of the system, according to some implementations.

Figure 1:
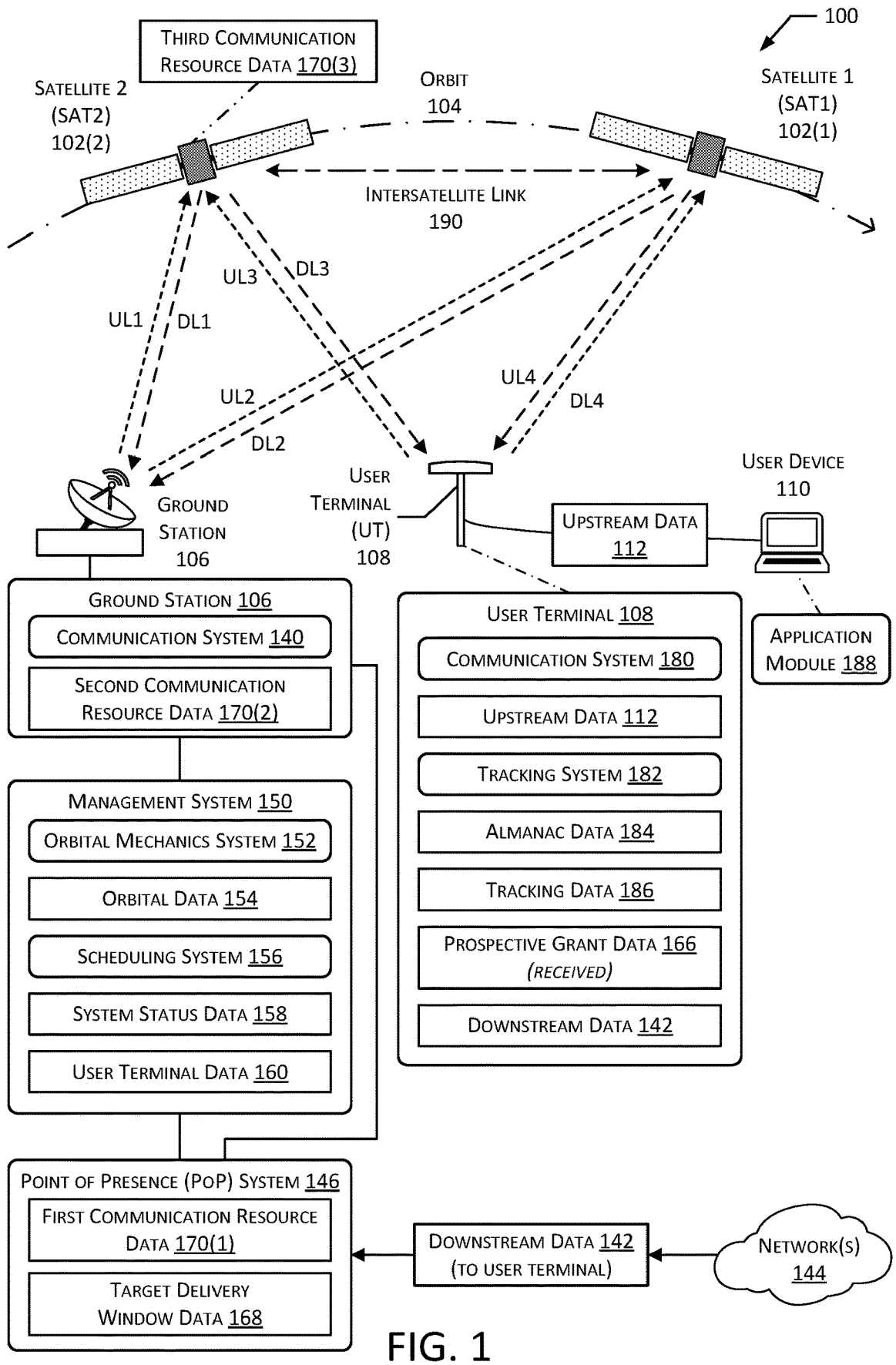
FIG. 1 illustrates a system that manages downstream traffic to a user terminal (UT), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. Compared to terrestrial wireless systems, systems using satellites introduce longer delays due to various factors including propagation delays. This is further complicated in the situation where the satellites are in non-geosynchronous orbits (NGO) and are in motion relative to a body such as the Earth. This constant motion results in a highly dynamic network in which propagation delays, ground stations, satellites, and other factors result in ongoing changes to communication resources used to provide communication service to user terminals (UTs). Described in this disclosure is a system that manages communication resources in this dynamic network to provide timely delivery of downstream data from one or more sources to a UT.

The satellites provide communication services between devices, such as user terminals (UT) located on or near the body. For example, a first UT on a first geographic location (geolocation) on the Earth may send upstream data to a first satellite that is in range of the first UT. The first satellite may send the upstream data to a ground station, another satellite, and so forth. Likewise, downstream data destined for the first UT may be received at a point-of-presence (PoP) and sent to the ground station that in turn sends the downstream data to the first satellite. The first satellite then sends the downstream data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth.

A period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. This results in a UT being frequently handed off from one satellite to another to maintain continuous communication services. In comparison, a geosynchronous satellite has an orbital period that coincides with the rotation of the earth, so a geosynchronous satellite appears to remain motionless with respect to the earth. While the apparent motionlessness with respect to the UT removes the need for handoffs, other drawbacks associated with the geosynchronous satellite remain.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency comprising 2 ms up to the satellite and 2 ms down to the UT. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allows for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

However, while the propagation delay introduced by use of an NGO satellite is less than that of geosynchronous satellites, the dynamic nature of the network using many NGO satellites may introduce additional latencies that may result in undesirable overall latencies between downstream data being received by a PoP and the ultimate delivery to the UT. Adding further complication is the asynchronous nature of downstream data received from the Internet. Downstream data from a server may suddenly appear at the PoP, such as in response to a request sent from the UT, and require timely delivery to the UT. Meanwhile, the configuration of communication resources used to send downstream data to the UT are changing as service is handed off from one satellite to another, link conditions change between the ground station and the satellite, downstream data from multiple sources is enqueued for transmission using a particular uplink modem, and so forth.

Traditional techniques of providing a particular level of quality of service (QoS) that provides a specified maximum delivery time of data rely on probabilistic models and operate in relatively static networks. For example, a terrestrial data network employing fiber optic links and radio links maintains fairly consistent performance during operation. While failover routing or load balancing across redundant links may be performed, the entire network is tightly controlled and largely deterministic. For example, the actual transit time of data on an operational transoceanic cable between now and five minutes later will remain substantially the same.

In comparison, traditional techniques of traffic management are infeasible in such a dynamic environment. An NGO satellite network may involve thousands of satellites, hundreds of ground stations, millions of combinations of communication resources, constantly changing satellite configurations, and also include variables associated with terrestrial operation such as variable delivery times for data from PoPs to ground stations.

Described in this disclosure are techniques for managing downstream traffic in a network that includes a constellation of satellites. Downstream data that is addressed to a particular UT is received by a first point-of-presence (PoP). For example, the PoP may be connected to the Internet and received downstream data from a server.

The first PoP assigns a targeted timeslot to the downstream data. For example, the wireless portion of the network between the ground station, satellite, and UT may be scheduled on 5 second intervals. A targeted timeslot indicates a particular 5 second interval within which the downstream data is expected to be delivered.

The first PoP determines the UT that the downstream data is addressed to and determines first communication resource data. The first communication resource data specifies the communication resources, such as ground station, uplink modem at the ground station, satellite, downlink modem on the satellite, and so forth that would result in delivery of the downstream data to the UT. In some implementations the downstream data may comprise a plurality of packets or other units of data transfer that are associated with delivery to the particular UT.

The first PoP determines target delivery window data indicative of a target delivery window. This target delivery window is indicative of the first PoP's assessment of how long it should take for the downstream data to be delivered to the UT. The target delivery window may take into consideration the expected delays associated with the links in the network specified by the first communication resource data to deliver the data. Data such as historical delays, current system status, and so forth may be used to determine the target delivery window data. For example, the target delivery window may be 27 ms long and expires at a specified time.

Based on the first communication resource data, the first PoP sends the downstream data, the target delivery window data, and at least a portion of first communication resource data to a first ground station. The first ground station receives this information and determines whether the downstream data can be delivered before the end of the target delivery window to the first UT using the communication resources available to the first ground station. If not, the first ground station may send the information along to a second ground station, send an error message to the first PoP, or take other action.

The first ground station may determine that the communication resources specified by the first communication resource data from the first PoP are available and suitable for sending the downstream data to a first satellite for delivery to the UT before the end of the target delivery window. In this situation, the first ground station proceeds to use the communication resources specified by the first communication resource data. However, some time has passed between the first PoP selecting communication resources and the arrival of the downstream data at the first ground station. As a result, the communication resources originally specified by the first PoP may no longer be available or suitable for accomplishing delivery within the target delivery window. Consequently, the first ground station may determine second communication resource data based on the target delivery window data that indicates other communication resources to be used. For example, the second communication resource data may specify the use of a different uplink modem, compared to the first communication resource data, for transmission to the satellite that has a shorter wait time before transmission.

The downstream data, the target delivery window data, and latest communication resource data are sent to the first satellite. The first satellite may use this information to determine the communication resources and time to send the downstream data to the UT. For example, the second communication resource data may specify a first downlink modem for use in sending the downstream data to the UT. If the delivery of the downstream data is expected to be completed before the end of the target delivery window, the first satellite may use the first downlink modem. However, if delivery of the downstream data is not expected to be completed before the end of the target delivery window, the downstream data may be allocated for transmission using a second downlink modem. If the first satellite will be unable to complete the transmission to the UT before moving out of range, the first satellite may send the downstream data, the target delivery window data, and so forth to a second satellite via an intersatellite link. The second satellite may then proceed to send the downstream data to the UT.

By using the system and techniques described in this disclosure, overall efficiency of a communication system using a satellite constellation is substantially improved and latency to deliver downstream data to a particular UT is minimized. The various elements of the system, such as the PoP, ground station, and satellite, use the target delivery window to determine whether they are able to complete delivery to the particular UT before that window expires. If not, the respective portion of the system may attempt to find a configuration of communication resources that are likely to result in delivery before the window expires.

This ongoing assessment at each element substantially reduces overall latencies by maximizing utilization of the dynamic system. This improves operation in an oversubscribed configuration in which a total aggregate data transfer rate of all UTs serviced by a ground station or satellite exceeds the maximum data transfer rate of that ground station or satellite. The system also decentralizes the scheduling and implementation of delivery, eliminating the complexity and additional delays introduced by having each element interact with a central control system to determine what to do next. Fault tolerance is improved by supporting a dynamic reallocation of communication resources without recourse to a central control system.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminal (UTs) 108, and a user device 110.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

One or more ground stations 106 are in communication with one or more satellites 102. The ground stations 106 may pass data between the satellites 102, a management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data or other data between the one or more communication networks and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data that indicates when communication is to be transferred from the first satellite 102(1) to the second satellite 102(2). Continuing the example, the scheduling system 156 may also specify communication parameters such as frequency, timeslot, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of user data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to user data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system 180 to establish communication with one or more satellites 102. The communication system 180 of the UT 108 may include components similar to those of the communication system 212 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes user data between the constellation of satellites 102 and the user device 110. The user data includes data originated by the user device 110 (upstream data 112) or addressed to the user device 110 (downstream data 142). The UT 108 may be fixed or in motion. For example, the UT 108 may be used at a residence or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time of flight correction, or other information associated with a specified time. The determination of the tracking data 186 may be ongoing. For example, the first UT 108 may determine tracking data 186 every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 190 provides for communication between satellites 102 in the constellation.

A device, such as a server, uses one or more networks 144 to send downstream data 142 that is addressed to a UT 108 or a user device 110 that is connected to the UT 108. The system 100 may include one or more PoP systems 146. Each PoP system 146 may comprise one or more servers or other computing devices. Separate PoP systems 146 may be located at different locations. In one implementation, a PoP system 146 may be associated with providing service to a plurality of UTs 108 that are located in a particular geographic region.

In this illustration, a first PoP system 146 accepts the downstream data 142 and proceeds to attempt delivery of the downstream data 142 to the UT 108. The PoP system 146 is in communication with one or more ground stations 106(1), 106(2), . . . , 106(G) and the management system 150. In some implementations one or more functions may be combined. For example, the PoP system 146 may perform one or more functions of the management system 150. In another example, the PoP system 146 may include an integrated ground station 106.

The PoP system 146 assigns a targeted timeslot to the downstream data 142. For example, scheduling handoffs of UTs 108 from one satellite 102 to another may be scheduled on 5 second intervals. The targeted timeslot may indicate a particular 5 second interval within which the downstream data 142 is expected to be delivered. The targeted timeslot may already be in progress. For example, the targeted timeslot assigned to the downstream data 142 may have begun 3 seconds before the downstream data 142 was received.

The PoP system 146 determines the UT 108 that the downstream data 142 is addressed to and determines first communication resource data 170(1). The first communication resource data 170(1) specifies the communication resources, such as ground station 106, uplink modem at the ground station 106, satellite, downlink modem on the satellite, and so forth that would result in delivery of the downstream data 142 to the UT 108. The downstream data 142 may comprise a single packet or other unit of data transfer, or a plurality of packets or other units of data transfer that are associated with delivery to the particular UT 108.

The PoP system 146 determines, based on the first communication resource data 170(1), target delivery window data 168 indicative of a target delivery window. This target delivery window is indicative of the first PoP system's 146 assessment of how long it should take for the downstream data 142 to be delivered to the UT 108. The target delivery window may take into consideration the expected delays associated with the uplinks and downlinks specified by the first communication resource data 170(1) to deliver the downstream data 142. Data such as historical delays, orbital data 154, system status data 158, and so forth may be used to determine the target delivery window data 168. For example, the target delivery window may be 27 ms long and expires at a specified time.

Based on the first communication resource data 170(1), the first PoP system 146 sends the downstream data 142, the target delivery window data 168, and at least a portion of the first communication resource data 170(1) to a first ground station 106(1). The first ground station 106(1) receives this information and determines whether the downstream data 142 can be delivered before the end of the target delivery window to the first UT 108 using the communication resources available to the first ground station 106(1). If not, the first ground station 106(1) may send the information along to a second ground station 106(2), send an error message to the first PoP 146, or take other action.

Some time has passed between the first PoP system 146 determining the first communication resource data 170(1) and the arrival of the downstream data 142 at the first ground station 106(1). As a result, the communication resources originally specified by the first PoP system 146 in the first communication resource data 170(1) may no longer be available or suitable for accomplishing delivery within the target delivery window.

The first ground station 106(1) assesses the target delivery window data 168 and available information associated with operation of the ground station 106 and the management system 150 to determine if the first communication resource data 170(1) specified by the PoP system 146 is available and suitable for sending the downstream data 142 to a first satellite 102 for delivery to the UT 108 before the end of the target delivery window. If so, the first ground station 106(1) proceeds to use the communication resources specified by the first communication resource data 170(1).

The communication resources specified in the first communication resource data 170(1) may no longer be suitable for sending the downstream data 142 to the UT 108 before the end of the target delivery window. The first ground station 106(1) may determine second communication resource data 170(2) based on the target delivery window data 168 that indicates other communication resources to be used. For example, the second communication resource data 170(2) may specify the use of a different uplink modem, compared to the first communication resource data 170(1), for transmission to the satellite 102.

The downstream data 142, the target delivery window data 168, and latest communication resource data 170 are sent to the first satellite 102(1). The first satellite 102(1) may use this information to determine third communication resource data 170(3) indicative of communication resources to send the downstream data 142 to the UT 108. For example, the second communication resource data 170(2) may specify a first downlink modem for the first satellite 102(1) to use in sending the downstream data 142 to the UT 108. If the delivery of the downstream data 142 is expected to be completed before the end of the target delivery window, the first satellite 102(1) may use the first downlink modem. However, if delivery of the downstream data 142 is not expected to be completed before the end of the target delivery window, the downstream data 142 may be allocated for transmission using a second downlink modem.

If the first satellite 102(1) is deemed unable to complete the transmission to the UT 108 before expiration of the target delivery window, the first satellite 102(1) may attempt to use other communication resources to complete the delivery. For example, the first satellite 102(1) may send the downstream data 142 and the target delivery window data 168 to a second satellite 102(2) via the intersatellite link 190. The second satellite 102(2) may then proceed to send the downstream data 142 to the UT 108. For example, if the first satellite 102(1) will be out of range of the UT 108 before the downstream data 142 can be transmitted, the first satellite 102(1) may forward the downstream data 142 to the second satellite 102(2) to complete delivery.

By using the system 100 as described herein, downstream data 142 is able to be delivered with relatively low latency in a highly dynamic network environment. This improves system efficiency by maximizing throughput while also improving overall user experience due to reductions in latency. The system 100 also substantially reduces the complexity of the satellites 102 to manage the highly dynamic network environment using onboard resources. For example, the satellite 102 may receive communication resource data 170 and target delivery window data 168 allowing for a rapid comparison between when the downstream data 142 should be delivered by and status of onboard systems. Continuing the example, if the downstream data 142 has been associated with a first downlink modem and a first buffer length of that first downlink modem is below a threshold value, the downstream data 142 may be enqueued for transmission using the first downlink modem. The threshold value may be determined based on a rate at which the buffer empties. However, if the first buffer length is greater than the threshold value, a second downlink modem may be used to send the downstream data 142 in a timely fashion.

Additional details associated with operation of the PoP system 146, the ground station 106, the satellites 102, and so forth are discussed in more detail with regard to FIGS. 3-8.

The satellite 102, the ground station 106, the user terminal 108, the user device 110, the management system 150, or other systems described herein may include clocks. These clocks may be synchronized to a common source. In some implementations the clock may be a global positioning system (GPS) disciplined clock or an atomic clock that provides a high accuracy and high precision time source. Output from the clock may be used to coordinate operation of the system 100.

Various configurations of the systems described in this disclosure may be used. In one implementation, the ground station 106, PoP system 146, and management system 150 may be present at different physical locations. For example, ground stations 106 may be present at different locations on the Earth to provide desired communication coverage with the satellites 102. Continuing the example, a first PoP system 146 comprising one or more servers may be located in a first datacenter. The first PoP system 146 may be tasked with providing communication services to a particular network, for devices within a particular geographic region, and so forth. For example, the first PoP system 146 may be collocated in a datacenter with network connections to the Internet. The management system 150 may comprise one or more servers at a second datacenter. The management system 150 may communicate with the individual PoP systems 146, the ground stations 106, the satellites 102, the UTs 108, and so forth.

The satellite 102, the ground station 106, the user terminal 108, the user device 110, the management system 150, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 2:
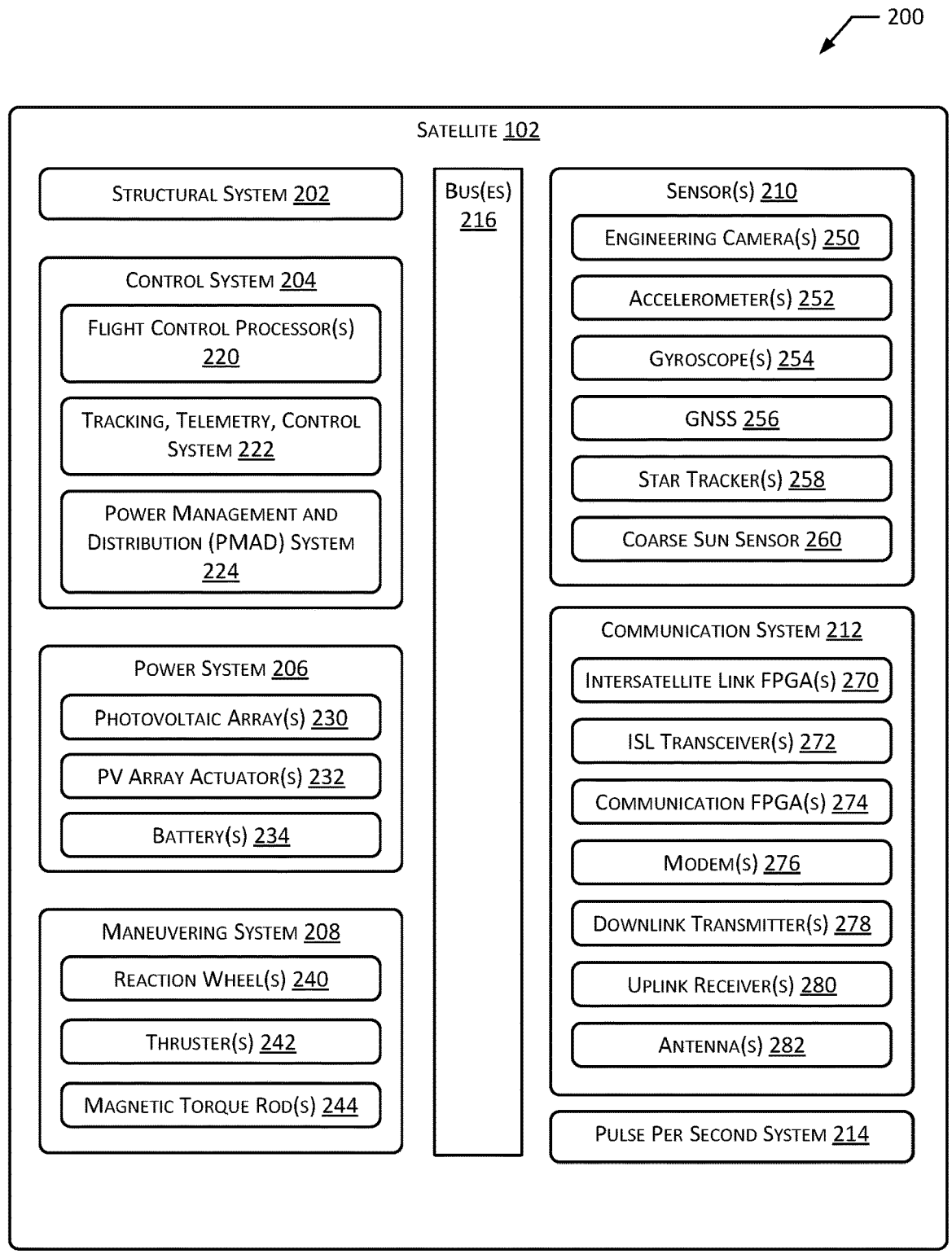
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more busses 216 may be used to transfer data between the systems onboard the satellite 102. In some implementations, redundant busses 216 may be provided. The busses 216 may include, but are not limited to, data busses such as Controller Area Network Flexible Data Rate (CAN FD), Ethernet, Serial Peripheral Interface (SPI), and so forth. In some implementations the busses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102 due to the gain.

The beam provided by the satellite 102 may comprise a plurality of subbeams. Subbeams on a satellite 102 may use different frequencies, timeslots, and so forth, to communicate to the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include hardware to support the intersatellite link 190. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

Figure 3:
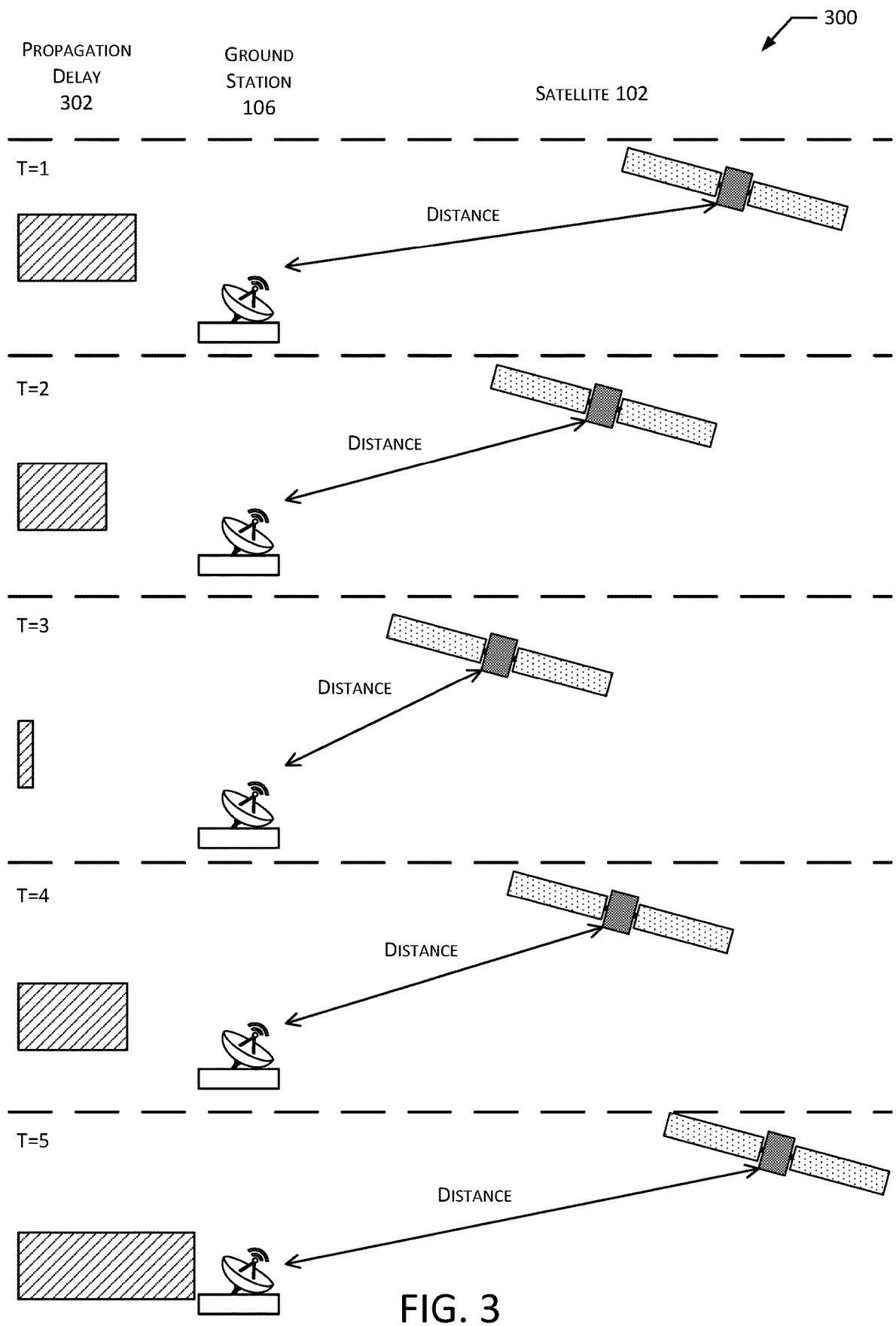
FIG. 3 illustrates changes in propagation delay that affect latency due to movement of a satellite in a non-geosynchronous orbit (NGO).

FIG. 3 illustrates changes in propagation delay 302 that affect latency due to movement of a satellite 102 in a non-geosynchronous orbit (NGEO). A propagation delay 302 results from the time it takes a signal to travel a distance between two stations, such as the ground station 106 and the satellite 102. While not shown here, a propagation delay 302 also occurs between the satellite 102 and the ground station 106.

A position of the satellite 102 in a non-geosynchronous orbit 104 changes over time, changing a distance between the ground station 106 and the satellite 102. Because the electromagnetic signal has a maximum speed of "c", as the distance changes so too does the amount of time it takes for a signal to travel between the ground station 106 and the satellite 102. In one implementation, the propagation delay 302 may be determined by dividing the distance by c. In other implementations other factors may be considered, such as the portion of the distance that passes through the atmosphere, maximum time error that still allows communication, relativistic effects, and so forth.

The distance between the ground station 106 and the estimated location of the satellite 102 may be calculated given the known geolocation of the ground station 106 and the orbital data 154. For example, a predicted position of the satellite 102 may be calculated at a particular time using the orbital data 154. The distance may then be calculated based on the known geolocation and the predicted position of the satellite 102. The distance "D" may also be known as the "slant range". The distance may be calculated using the following equations:

$$r = h + B \quad \quad \quad \text{EQUATION 1}$$

where r=distance between the geocenter of Earth and the satellite and

B is a distance between the geocenter and the ground station 106

$$D = \sqrt{(B \cdot \cos(\in))^2 + r^2 - B^2} - B \cdot \cos(\in) \quad \quad \text{EQUATION 2}$$

where $\in$ is an elevation angle to the satellite relative to local vertical

In this illustration a bar graph depicting a relative magnitude of a propagation delay 302 is shown for times t=1, 2, 3, 4, and 5. Also shown is the ground station 106 and the satellite 102 that is providing communication services. As time progresses, distance between the satellite 102 and the ground station 106 changes due to the relative motion of the satellite 102 with respect to the Earth where the ground station 106 is placed. At time t=1 where the distance is relatively large, the propagation delay 302 is relatively large. As the distance decreases to time t=3, so too does the propagation delay 302. As a result of this changing propagation delay 302, the overall delay associated with sending data to the satellite 102 will change from one time to another. Likewise, the overall delay associated with sending data from the satellite 102 to the UT 108 will also change from one time to another.

Figure 4:
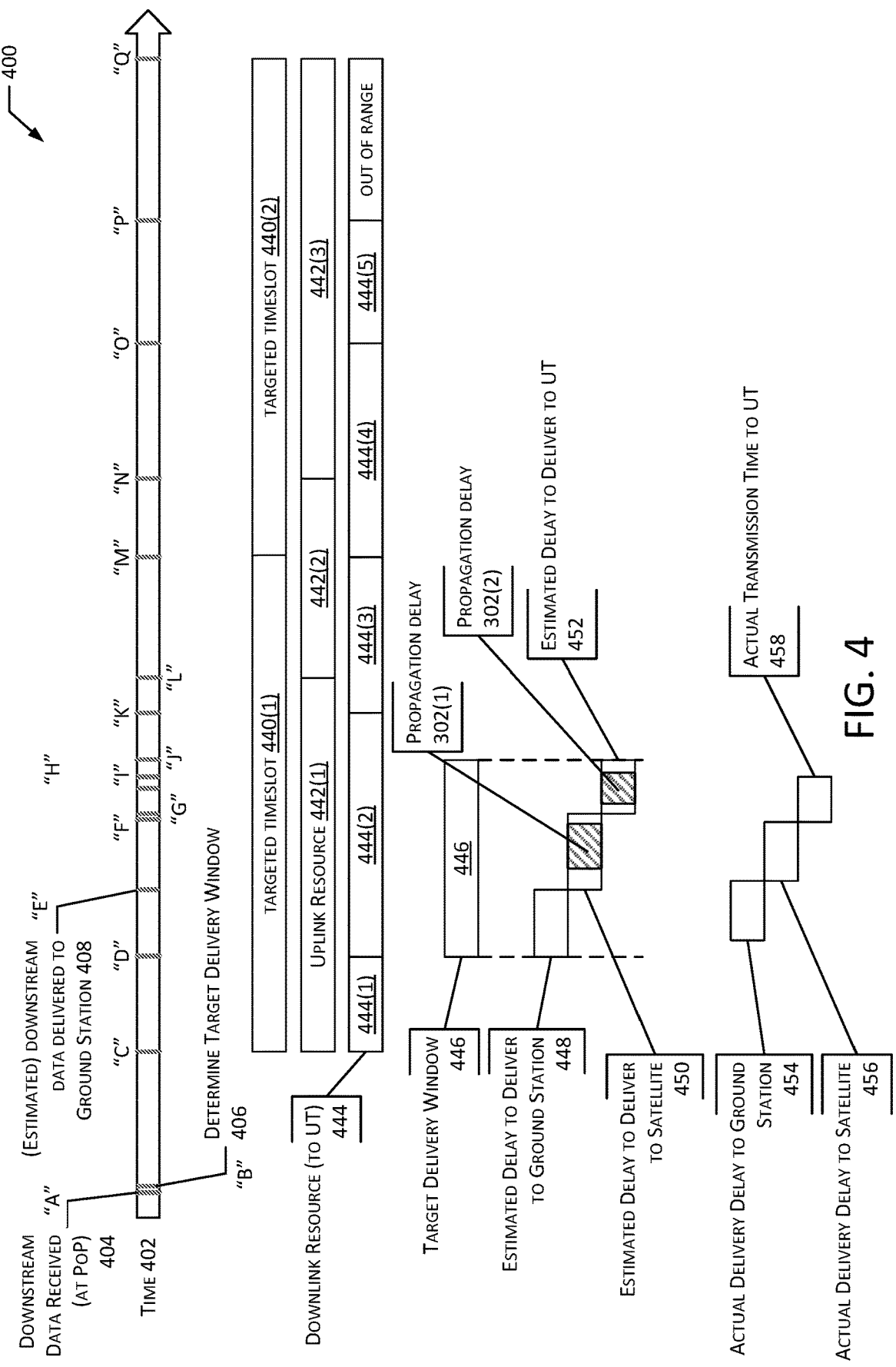
FIG. 4 illustrates a timeline of downstream data being allocated to a particular targeted timeslot for delivery to the UT and associated intervals taken into consideration, according to some implementations.

FIG. 4 illustrates a timeline 400 of downstream data 142 being allocated to a particular targeted timeslot for delivery to the UT 108 and associated intervals taken into consideration, according to some implementations. The timeline 400 is not necessarily depicted to scale. For example, the targeted timeslots 440 may be 5,000 milliseconds (ms) in duration while the target delivery window 446 is 30 ms in duration.

Time 402 is depicted as increasing from left to right. Various points in time 402 are indicated with reference letters "A", "B", "C", and so forth.

At 404 as indicated at time "A", downstream data 142 is received at a PoP system 146. The downstream data 142 is associated with a targeted timeslot 440. For example, the downstream data 142 may be associated with the targeted timeslot 440(1). The system 100 may use the targeted timeslots 440 to coordinate operations such as communication handovers. For example, communication handovers in which a UT 108 is transitioned from one satellite 102 to another may be performed at 5 second intervals when necessary.

At 406 as indicated at time "B", the PoP system 146 determines the target delivery window data 168 and the first set of communication resource data 170(1). The target delivery window data 168 is indicative of a target delivery window 446. The target delivery window 446 is indicative of an assessment as to how long it should take for the downstream data 142 to be delivered to the UT 108 when sent by a given part of the system 100, such as the PoP system 146. In this illustration, the target delivery window 446 extends from time "D" to "J".

The PoP system 146 may use data provided by the management system 150. The PoP system 146 determines the UT 108 associated with the downstream data 142. For example, the PoP system 146 may send a UT identifier to the management system 150 and data indicative of the targeted timeslot 440. The management system 150 may provide data indicative of which satellite(s) 102 will be in range of the UT 108 and for how long during the targeted timeslot 440 and which ground station(s) 106 will be in range of those satellites 102 and for how long during the targeted timeslot 440.

The PoP system 146 may determine uplink resources 442 and downlink resources 444 available during at least the targeted timeslot 440. The uplink resources 442 may comprise systems such as ground station uplink modems, transmitters, antennas, and so forth. The downlink resources 444 may comprise systems such as one or more modems 276 and their associated downlink transmitters 278. The uplink resources 442 and the downlink resources 444 are discussed in more detail with regard to FIG. 5. Availability of these communication resources may be affected by internal and external factors. Internal factors, for example, may include modulation and coding in use, data transfer rates, queue depth, equipment being offline due to maintenance, and so forth. External factors, for example, may include propagation changes, weather effects, orbital motion, and so forth. These factors may introduce delays to the delivery of the downstream data 142.

The availability of particular uplink resources 442 or downlink resources 444 with respect to time 402 may vary as a result from the interaction of these factors. For example, the orbital motion of the satellites 102, different communication hardware and antenna configurations, potentially different geographic locations of the ground station 106 and the UTs 102, and so forth can produce situations in which an uplink from the ground station 106 to the satellite 102 may be available for a longer time 402 than a downlink from the satellite 102 to a particular communication resource such as a subbeam of the UT 108. In this illustration, the timeline is shown with respect to a particular UT 108. The uplink resource 442(1) for communication from the ground station 106 to the satellite 102 extends from time "C" to "L". In comparison, downlink resource 444(1) extends from time "C" to "D", downlink resource 444(2) extends from "D" to "K", and downlink resource 444(3) extends from "K" to "M".

Based on the determined uplink resources 442 and the downlink resources 444 available, the PoP system 146 determines first communication resource data 170(1). The first communication resource data 170(1) is indicative of at least a portion of the communication resources that are determined to be used for delivering the downstream data 142 to the UT 108. For example, the first communication resource data 170(1) may specify the first ground station 106(1), a particular uplink modem at the first ground station 106(1), the first satellite 102(1), a particular downlink modem at the first satellite 102(1), and so forth. The communication resource data 170 is discussed in more detail with regard to FIG. 5.

The PoP system 146 uses the communication resources indicated by the first communication resource data 170(1) to determine the target window data 168. Data such as historical delays, system status data 158, and so forth for those communication resources may be used to determine the target delivery window data 168. For example, historical delays may comprise information such as a minimum latency, maximum latency, average latency, and so forth for a communication resource.

While determining the target delivery window 446, the PoP system 146 may include an estimated delay to deliver 448 from the PoP system 146 to the ground station 106. For example, the estimated delay to deliver 448 may comprise an average latency measured along a fiber optic terrestrial connection that connects the PoP system 146 to the ground station 106. In this illustration, the estimated delay to deliver 448 extends from time "D" to "E". At 408, indicated at time "E", the PoP system 146 estimates the downstream data 142 should be delivered to the ground station 106.

While determining the target delivery window 446, the PoP system 146 may include an estimated delay to deliver 450 from the ground station 106 to the satellite 102. For example, the estimated delay to deliver 450 may comprise an average latency measured for a first modem that is used as part of the uplink to the satellite 102. In this illustration, the estimated delay to deliver 450 extends from time "E" to "G".

In some implementations the estimated delay to deliver 450 to the satellite 102 may include the propagation delay 302(1). The propagation delay 302(1) may be based on the location of the ground station 106 and a predicted position of the satellite 102 at a time associated with transmitting the downstream data 142 to the satellite 102.

While determining the target delivery window 446, the PoP system 146 may include an estimated delay to deliver 452 from the satellite 102 to the UT 108. For example, the estimated delay to deliver 452 may comprise an average latency measured for a downlink modem of the satellite 102. In this illustration, the estimated delay to deliver 452 extends from time "G" to "J".

The estimated delay to deliver 452 to the UT 108 may include the propagation delay 302(2). The propagation delay 302(2) may be based on the predicted position of the satellite 102 and the location of the UT 108 at a time associated with transmitting the downstream data 142 from the satellite 102.

In one implementation, the target delivery window 446 may comprise the sum of the estimated delay to delivers 448, 450, 452. A start time and an end time of the target delivery window 446 may be based on one or more of the uplink resources 442, the downlink resources 444, or other information.

The target delivery window 446 may also be based at least in part on a classification priority of the downstream data 142. In some implementations, the PoP System 146 may determine a classification priority that is associated with the downstream data 142. Downstream data 142 that is associated with a higher classification priority may receive expedited processing by the system 100 relative to downstream data 142 that is associated with a lower classification priority. This expedited processing may result in a shorter target delivery window 142 than downstream data 142 with a lower classification priority.

The classification priority may be specified based on one or more of the UT 108, type of the downstream data 142, source of the downstream data 142, quality of service data, and so forth. For example, first downstream data 142(1) addressed to a first UT 108(1) may be given a higher classification priority than second downstream data 142(2) addressed to a second UT 108(2). In another example, the type of the downstream data 142, such as a protocol, service, application, and so forth may be used to determine the classification priority. Continuing the example, downstream data 142 using a transmission control protocol (TCP) may have a different classification priority than downstream data 142 using a user datagram protocol (UDP). In another example, first downstream data 142(1) from a first network address may be given a higher classification priority than second downstream data 142(2) from a second network address. In still another example, quality of service (QoS) data, such as a QoS header value may be used to determine a classification priority.

In one implementation, the classification priority may affect the order in which downstream data 142 is enqueued for sending to a next portion of the system 100. For example, downstream data 142 with a higher classification priority may be enqueued first for transmission from the PoP system 146 to the ground station 106. As a result, the estimated delay to deliver to ground station 448 may be shorter for downstream data 142 with the higher classification priority.

As mentioned previously, the target delivery window 446 is an estimate of how long downstream data 142 should be expected to take to reach the UT 108. For comparison, actual delivery delays are shown. For example, the actual delivery delay to ground station 454, the actual delivery delay to satellite 456, and the actual transmission time 458 from the satellite 102 to the UT 108 are shown. In this illustration, the actual delays differ from the estimated delays. This is to be expected due to the uncertainty associated with the communication resources.

FIG. 5 illustrates data associated with operation of the system 100, according to some implementations. The data may include a parameter 502 and an associated value 504.

The target delivery window data 168 may comprise one or more of a start time, estimated ground station delivery time, estimated satellite delivery time, an end time, a duration, or other data. The start time indicates an estimated time at which the downstream data 142 will begin moving through the system 100. In some implementations the start time may be the time the downstream data 142 was received by the PoP system 146. The estimated ground station delivery time is indicative of an estimated time that the downstream data 142 is expected to be available at the ground station 106. For example, time "E" on the timeline of FIG. 4. The estimated satellite delivery time is indicative of an estimated time that the downstream data 142 is expected to be available at the satellite 102. For example, time "G" on the timeline of FIG. 4. The end time may be the estimated time at which the downstream data 142 is expected to have been delivered to the UT 108. For example, time "J" on the timeline of FIG. 4.

In one implementation, the start time and the end time, or a start time and the duration, may be indicative of the target delivery window 446. In some implementations, the target delivery window data 168 may be indicative of only the end time. For example, the target delivery window 446 may specify a time value that is indicative of a time 402 that the downstream data 142 is expected to be delivery by.

Times, intervals, durations, and the like as used in this disclosure may be specified with respect to actual clock time, system time, system timing references, discrete timeslots or interval indicators, and so forth. For example, time ticks may be specified relative to an epoch that resets at 10 minute intervals. In another example, actual clock time obtained from a Global Position System receiver may be used.

The communication resource data 170 is representative of one or more communication resources associated with delivering the downstream data 142 to the UT 108. For example, the communication resource data 170 may be indicative of a ground station identifier, the targeted timeslot 440, a satellite identifier, one or more uplink resources 442, one or more downlink resources 444, or other data. The ground station identifier is indicative of the next ground station 106 that has been determined to handle the associated downstream data 142. The targeted timeslot 440 indicates the targeted timeslot 440 associated with the downstream data 142, such as determined by the PoP system 146. The satellite identifier indicates the next satellite 102 that has been determined to handle the associated downstream data 142.

The uplink resources 442 may include a ground station uplink modem assignment, uplink timeslot start, uplink timeslot end, and so forth. The downlink resources 444 may include a satellite downlink modem assignment, downlink timeslot start, downlink timeslot end, subbeam identifier indicative of a particular subbeam, and so forth.

The communication resource data 170 may comprise additional information as well. This additional information may be determined by one or more of the PoP system 146, the management system 150, the ground station 106, the satellite 102, and so forth. For example, an intersatellite link (ISL) next satellite ID may specify another satellite 102 that may provide communication services to the UT 108 associated with the downstream data 142. Continuing the example, if the satellite 102 is unable to complete delivery to the UT 108 before the end of the target delivery window 446, the downstream data 142 may be sent to a second satellite 102(2) specified by the ISL next satellite ID. The second satellite 102(2) may then attempt to deliver the downstream data 142.

Figure 6:
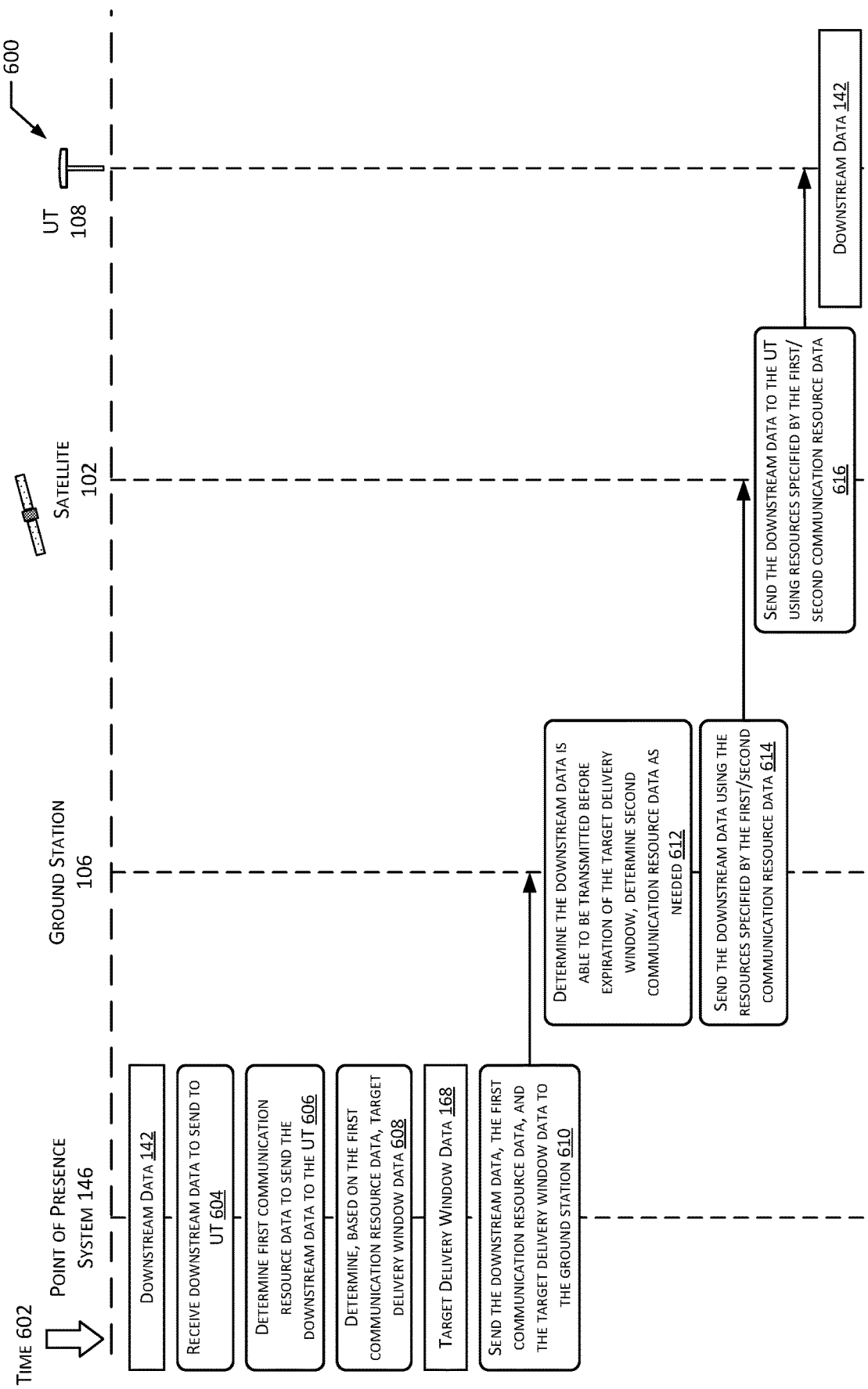
FIG. 6 illustrates a process of managing communication resources to deliver downstream data to the UT within a target delivery window, according to some implementations.

FIG. 6 illustrates a process 600 of managing communication resources to deliver downstream data 142 to the UT 108 within a target delivery window 446, according to some implementations. In this illustration, time 602 generally increases from the top to the bottom of the page. For example, an operation depicted at the top of the page may occur before an operation depicted at the bottom of the page. In this illustration, the PoP system 146, the ground station 106, the satellite 102, and the UT 108 are shown. The other elements of the system, such as the user device 110, are omitted from this illustration for clarity, and not as a limitation.

Operations 604 through 610 may be implemented by one or more of the PoP system 146 or the management system 150.

During operation of the system 100, at 604 the PoP system 146 receives downstream data 142 to be delivered to a UT 108 or associated user device 110. For example, a server on the Internet sends the downstream data 142 to the PoP 146 comprising a packet with a destination address of the user device 110.

At 606 first communication resource data 170(1) is determined to send the downstream data 142 to the UT 108. For example, the PoP system 146 may use information from the management system 150 to determine which satellites 102 are in range of the UT 108 for the targeted time slot 440, which ground stations 106 are in range of those satellites 102, and so forth.

At 608, based on the first communication resource data 170(1), target delivery window data 168 is determined. For example, based on system status data 158, information about actual delivery times returned by the satellites 102, historical data, and so forth, the target delivery window 446 is calculated.

At 610 the downstream data 142, first communication resource data 170(1), and the target delivery window data 168 are sent to the ground station 106. For example, the first communication resource data 170(1) may include a ground station ID that specifies the first ground station 106(1).

The PoP system 146 may prioritize delivery based on the target delivery window 446. For example, the downstream data 142 may be enqueued for transmission based on the time at which the target delivery window 446 expires. Continuing the example, first downstream data 142(1) that has a first target delivery window 446(1) that expires at a first time may be enqueued for transmission before second downstream data 142(2) that has a second target delivery window 446(2) that expires at a second time after the first time.

Delivery of the downstream data 142 may also be delayed based on the target delivery window 446. For example, if the target delivery window 446 does not expire for greater than a threshold interval of time, the PoP system 146 may delay sending the downstream data 142. These delays may be used to control communication resource usage in subsequent systems. For example, the PoP system 146 may delay sending the downstream data 142 to the ground station 106 to aid in managing the quantity of data in a buffer at the ground station 106.

Operations 612 through 614 may be implemented by the ground station 106.

At 612 the ground station 106 determines the downstream data 142 is able to be transmitted before expiration of the target delivery window 446. For example, the ground station 106 may assess the current status of the uplink resources 442 specified by the first communication resource data 170(1). If those uplink resources 442 are deemed to result in delivery of the downstream data 142 before the target delivery window 446 expires, those resources may be used.

The ground station 106 may prioritize delivery based on the target delivery window 446. For example, the downstream data 142 may be enqueued for transmission based on the time at which the target delivery window 446 expires. Continuing the example, first downstream data 142(1) that has a first target delivery window 446(1) that expires at a first time may be enqueued for transmission before second downstream data 142(2) that has a second target delivery window 446(2) that expires at a second time after the first time.

Delivery of the downstream data 142 may also be delayed based on the target delivery window 446. For example, if the target delivery window 446 does not expire for greater than a threshold interval of time, the ground station 106 may delay sending the downstream data 142. These delays may be used to control communication resource usage in subsequent systems. For example, the ground station 106 may delay sending the downstream data 142 to the satellite 102 to aid in managing the quantity of data in a buffer onboard the satellite 102.

However, if the ground station 106 determines that the downstream data 142 will not be delivered to the UT 108 before the target delivery window 446 expires, the ground station 106 determines second communication resource data 170(2) indicative of different communication resources. For example, the second communication resource data 170(2) may specify a different uplink modem or other resource.

At 614 the downstream data 142 is sent to the satellite 102 using the communication resources specified by the first communication resource data 170(1) or second communication resource data 170(2). In some implementations, one or more of communication resource data 170 or the target delivery window data 168 may be sent to the satellite 102.

Operation 616 may be implemented by the satellite 102. At 616 the satellite 102 sends the downstream data 142 to the UT 108 using the communication resources specified by the first/second communication resource data 170 sent by the ground station 106. In some implementations, the satellite 102 may determine if third communication resource data 170(3) is needed. For example, the satellite 102 may assess the current status of the downlink resources 444 specified by the second communication resource data 170(2). If those downlink resources 444 are deemed to result in delivery of the downstream data 142 before the target delivery window 446 expires, those resources may be used. Otherwise, the third communication resource data 170(3) may be determined.

The satellite 102 may prioritize delivery based on the target delivery window 446. For example, the downstream data 142 may be enqueued for transmission based on the time at which the target delivery window 446 expires. Continuing the example, first downstream data 142(1) that has a first target delivery window 446(1) that expires at a first time may be enqueued for transmission before second downstream data 142(2) that has a second target delivery window 446(2) that expires at a second time after the first time.

Delivery of the downstream data 142 may also be delayed based on the target delivery window 446. For example, if the target delivery window 446 does not expire for greater than a threshold interval of time, the satellite 102 may delay sending the downstream data 142 to the UT 108. These delays may also be used to control communication resource usage in subsequent systems.

The satellite 102 may send data indicative of one or more delays to one or more of the ground station 106, the PoP system 146, the management system 150, and so forth. For example, the satellite 102 may determine a queuing delay between when the satellite receives the downstream data 142 and transmission of the downstream data 142 to the first UT 108 begins. In another example, the satellite 102 may determine an actual delay between when the satellite 102 receives the downstream data 142 and transmission of the downstream data 142 to the first UT 108 is complete. The queuing delay, the actual delay, or other information may be sent to one or more of the ground station 106, the PoP system 146, the management system 150, and so forth.

The UT 108 receives the downstream data 142. The UT 108 may subsequently send the downstream data 142 to the user device 110. For example, the UT 108 may use a local area network to send the downstream data 142 to the user device 110.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first point-of-presence (PoP) system;
a first ground station that is in communication with the first PoP system;
a first satellite that is in communication with the first ground station;
a first user terminal (UT) that is in communication with the first satellite;
the first PoP system to:
   receive first data having a destination address associated with the first UT;
   determine second data indicative of communication resources associated with delivery of the first data to the first UT, wherein the second data is indicative of the first ground station;
   determine third data indicative of a time interval during which the first data is expected to be delivered to the first UT; and
   send the first data, the second data, and the third data to the first ground station; and
the first ground station to:
   receive the first data, the second data, and the third data;
   determine at a first time that use of the communication resources is expected to result in delivery of the first data to the first UT during the time interval; and
   send the first data at a second time using one or more of the communication resources.

2. The system of claim 1, the first PoP system to determine the third data based on one or more of:
an estimated delay to deliver the first data from the first PoP system to the first ground station,
an estimated delay to deliver the first data from the first ground station to the first satellite, or
an estimated delay to deliver the first data from the first satellite to the first UT.

3. The system of claim 1, wherein the third data is based on:
a propagation delay indicative of a time for a signal to travel from the first ground station to a predicted location of the first satellite.

4. The system of claim 1, the first PoP system to determine the third data based on one or more of:
a first interval indicative of uplink resource availability associated with transmission of the first data from the first ground station to the first satellite, or
a second interval indicative of downlink resource availability associated with transmission of the first data from the first satellite to the first UT.

5. The system of claim 1, the first PoP system to determine the third data based on one or more of:
fourth data indicative of one or more latencies associated with previously processed data having a destination address associated with the first UT, or
fifth data indicative of sixth data being sent between the first PoP system and one or more user terminals serviced by the first PoP system.

6. The system of claim 1, the first satellite to:
determine fourth data indicative of one or more of:
   a queuing delay between when the first satellite receives the first data and transmission of the first data to the first UT begins, or
   an actual delay between when the first satellite receives the first data and transmission of the first data to the first UT is complete; and
send the fourth data to the first PoP system.

7. The system of claim 1, the first ground station to:
determine at a third time after the first time and before the second time that the first data will be undeliverable to the first UT during the time interval; and
determine fourth data indicative of communication resources associated with transmission of the first data to the first satellite or a second satellite.

8. The system of claim 7, wherein the second data is indicative of use of a first modem at the first ground station and the fourth data is indicative of a second modem at the first ground station.

9. The system of claim 1, the first PoP system to:
receive fourth data;
determine fifth data indicative of communication resources associated with delivery of the fourth data to the first UT, wherein the fifth data is indicative of the first ground station and a first uplink resource;
determine sixth data indicative of a second time interval during which the fourth data is expected to be delivered to the first UT;
send the fourth data, the fifth data, and the sixth data to the first ground station; and the first ground station to:
receive the fourth data, fifth data, and the sixth data;
determine at a third time that use of the communication resources specified by the fifth data is not expected to result in delivery of the fourth data to the first UT during the second time interval;
determine seventh data indicative of one or more of:
   a second uplink resource that differs from the first uplink resource,
   a second ground station, or
   an intersatellite link between the first satellite and a second satellite; and
send the fourth data at a fourth time using one or more of the communication resources indicated by the seventh data.

10. The system of claim 1, further comprising:
a second PoP system that is in communication with the first satellite via the first ground station; and
the first ground station to:
   allocate a first portion of uplink resources associated with the first satellite to the first PoP system; and
   allocate a second portion of the uplink resources associated with the first satellite to the second PoP system.

11. The system of claim 1, the first ground station to:
receive fourth data having a destination address associated with a second UT;
receive fifth data indicative of a second time interval during which the fourth data is expected to be delivered to the second UT;
determine the second time interval ends before the time interval;
send the fourth data to the first satellite at a third time; and
send the first data to the first satellite at a fourth time, wherein the fourth time is after the third time.

12. A method comprising:
receiving, at a first point-of-presence (PoP) system, first data having a destination address associated with a first user terminal (UT);
determining, at the first PoP system at a first time, second data indicative of communication resources associated with delivery of the first data to the first UT;
determining, at the first PoP system, third data indicative of a time interval during which the first data is expected to be delivered to the first UT, wherein the third data is based at least in part on two or more of:

an estimated delay to deliver the first data from the first PoP system to a first ground station,
an estimated delay to deliver the first data from the first ground station to a first satellite, or
an estimated delay to deliver the first data from the first satellite to the first UT; and
sending the first data to the first ground station based at least in part on the second data and the third data.

13. The method of claim 12, further comprising:
determining a predicted location of the first satellite;
determining a propagation delay indicative of a time for a signal to travel from the first ground station to the predicted location; and
wherein the third data is further based on the propagation delay.

14. The method of claim 12, further comprising:
determining a first interval indicative of uplink resource availability associated with transmission of the first data from the first ground station to the first satellite;
determining a second interval indicative of downlink resource availability associated with transmission of the first data from the first satellite to the first UT; and
wherein the third data is further based on the first interval and the second interval.

15. The method of claim 12, further comprising:
determining, at a second time after the first time, that use of the communication resources specified by the second data are not expected to result in delivery of the first data to the first UT during the time interval;
determining fourth data indicative of one or more of:
an uplink resource,
a second ground station, or
an intersatellite link between the first satellite and a second satellite; and
sending the first data to the first UT based on the fourth data.

16. The method of claim 12, further comprising:
determining fourth data indicative of one or more latencies associated with previously processed data having a destination address associated with the first UT;
determining fifth data indicative of undelivered data being sent between the first PoP system and one or more user terminals serviced by the first PoP system; and
wherein the third data is further based on one or more of the fourth data or the fifth data.

17. A system comprising:
a first ground station that is in communication with a first point-of-presence (PoP) system and a first satellite, the first ground station to;
receive, from the first PoP system at a first time, first data for delivery to a first user terminal (UT);
receive, from the first PoP system, second data indicative of a time interval during which the first data is expected to be delivered to the first UT;
receive, from the first PoP system, third data indicative of communication resources of the first ground station associated with delivery of the first data to the first UT;
determine fourth data indicative of availability of communication resources of the first ground station;
determine, based on the fourth data and the second data, that an expected delivery of the first data to the first UT is after the time interval specified by the second data;
determine, based on the first data and the second data, fifth data indicative of second communication resources of the first ground station associated with delivery of the first data to the first UT; and
send the first data to the first UT using one or more of the second communication resources indicated by the fifth data.

18. The system of claim 17, wherein the second data is based on one or more of:
an estimated delay to deliver the first data from the first PoP system to the first ground station,
an estimated delay to deliver the first data from the first ground station to the first satellite, or
an estimated delay to deliver the first data from the first satellite to the first UT.

19. The system of claim 17, wherein the second data is based on a propagation delay indicative of a time for a signal to travel from the first ground station to a predicted location of the first satellite.

20. The system of claim 17, wherein the third data is indicative of use of a first modem at the first ground station and the fifth data is indicative of a second modem at the first ground station.

* * * * *